Figure 1:
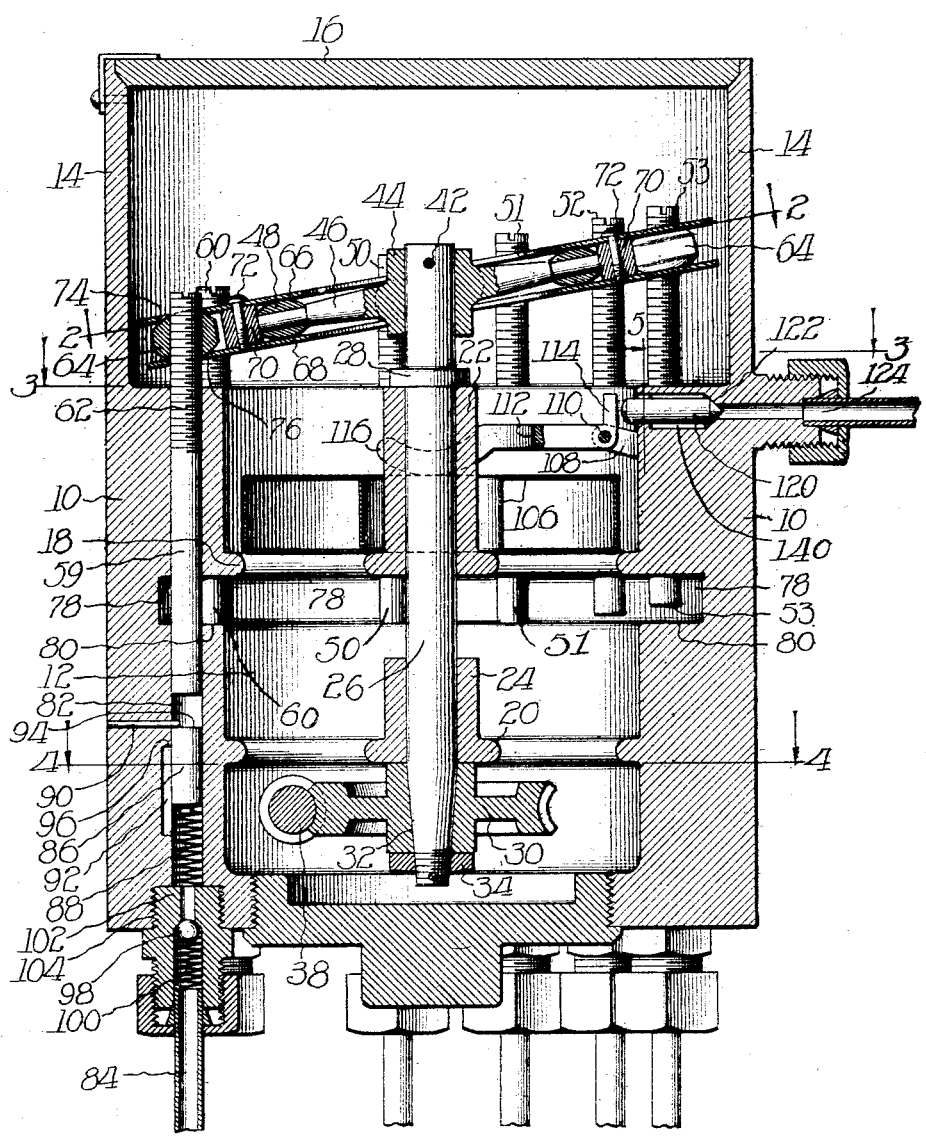

J. A. CHARTER.
LUBRICATOR.
APPLICATION FILED MAR. 2, 1910.

989,694.

Patented Apr. 18, 1911.

3 SHEETS—SHEET 1.

Witnesses:
Robert N. Weir
M. Rosenzweig

Inventor:
James A. Charter
By Cheever & Cox
Attys

J. A. CHARTER.
LUBRICATOR.
APPLICATION FILED MAR. 2, 1910.
989,694.
Patented Apr. 18, 1911.
3 SHEETS—SHEET 2.
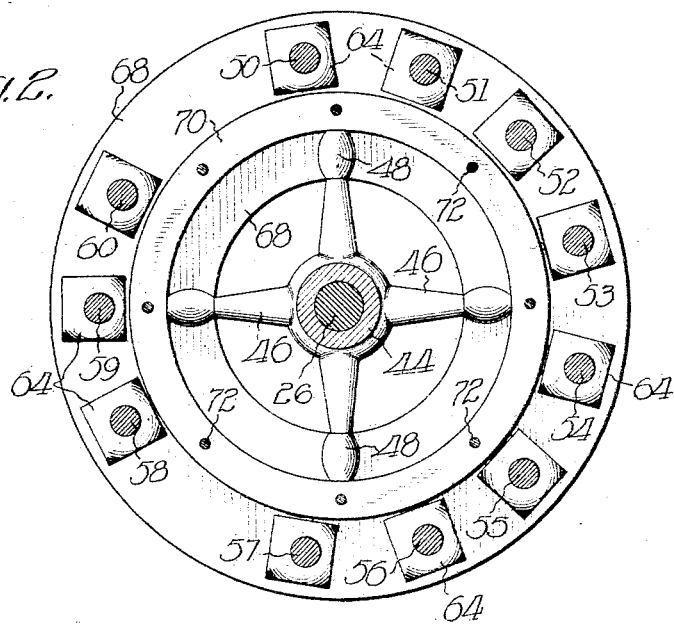
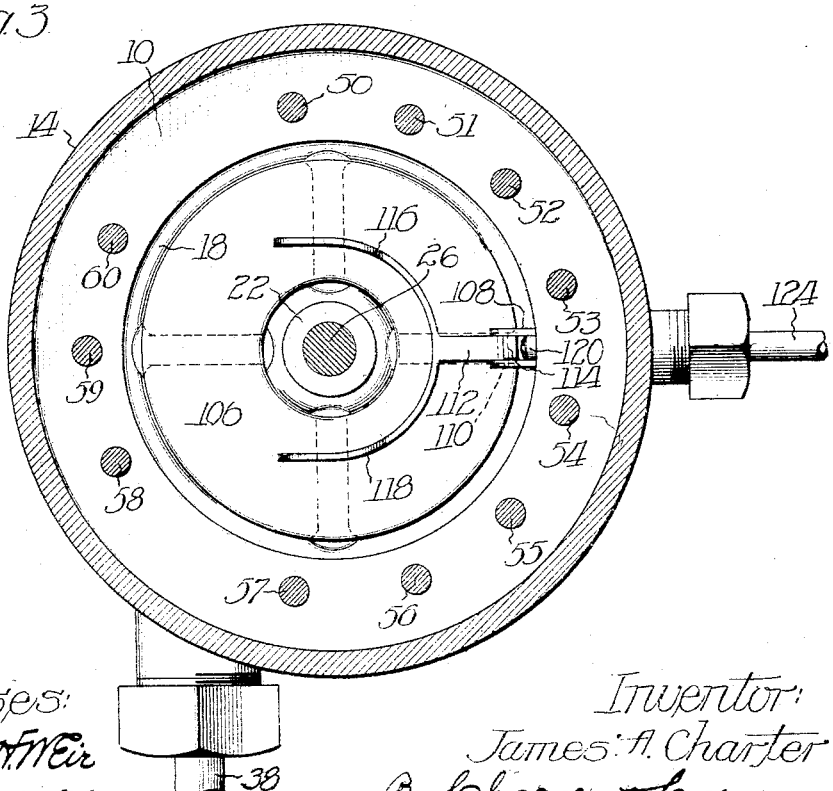
Witnesses:
Robert H. Weir
M. Lowomagi
Inventor:
James A. Charter
By Cheever & Cox Attys

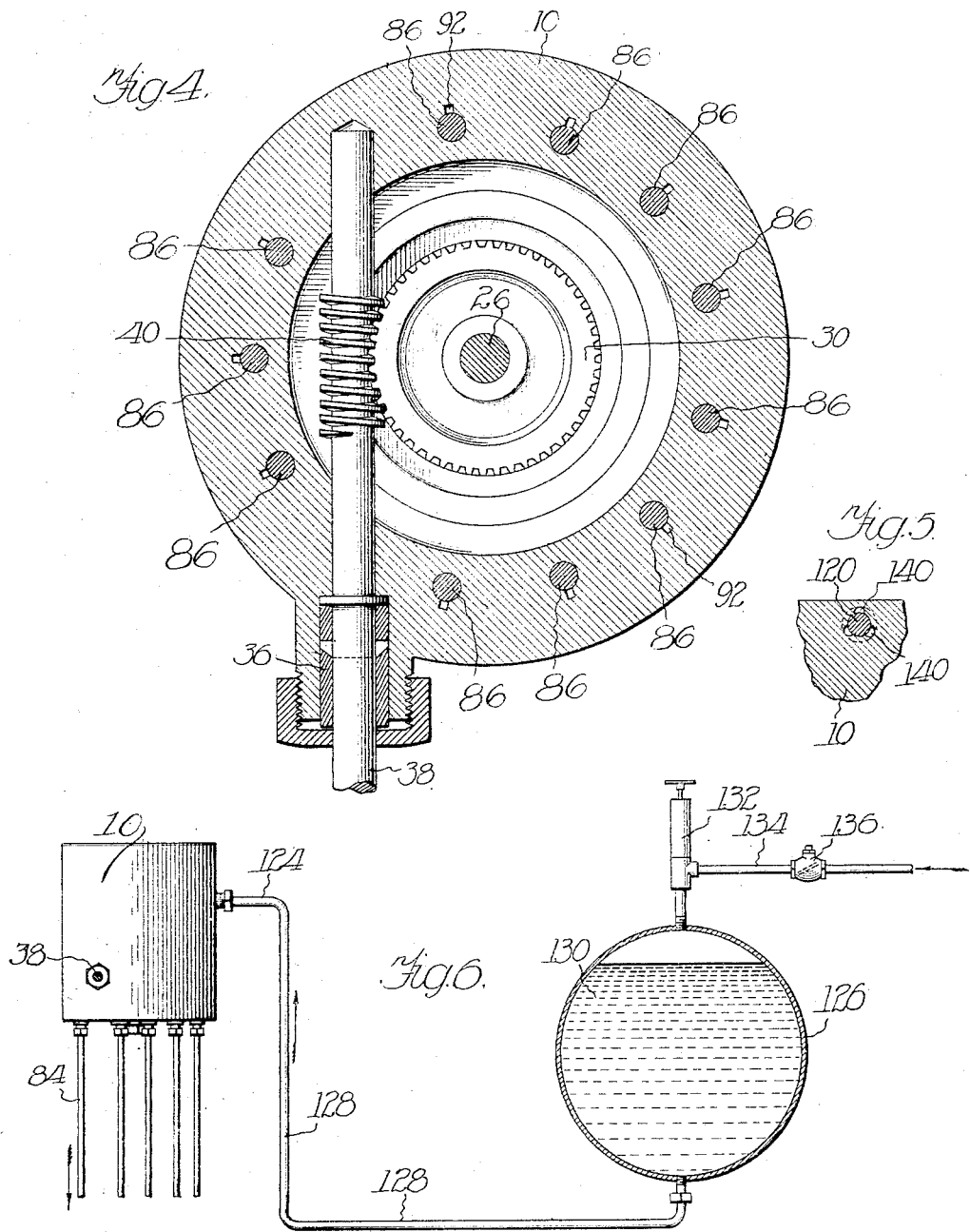

UNITED STATES PATENT OFFICE.

JAMES A. CHARTER, OF CHICAGO, ILLINOIS.

LUBRICATOR.

989,694.   Specification of Letters Patent.   Patented Apr. 18, 1911.

Application filed March 2, 1910. Serial No. 546,893.

*To all whom it may concern:*

Be it known that I, JAMES A. CHARTER, a citizen of the United States, residing at Chicago, in the county of Cook and State of Illinois, have invented a certain new and useful Improvement in Lubricators, of which the following is a specification.

This invention relates to force feed lubricators or oil pumps for use in connection with machinery in general, and particularly with automobile engines.

The object of the invention is, broadly, to provide such a device which will work economically with a very small consumption of power to positively force the oil or other lubricating material to the bearings to be lubricated, which can be easily and cheaply made and set up in place, and which is not readily liable to get out of order.

The invention consists in a device capable of carrying out the foregoing objects in which a plurality of oil pumps are provided and operated from a single source of power, the pumps operating gradually, and in a sense at least, successively so that only a portion of the pumps require power at a time, or in a very compact device in which the different individual pumps are arranged in approximately a circle, and the operating member moves them one after another so that a nearly constant quantity of oil is pumped from the oil chamber to different bearings to be oiled, in a given time and with a given amount of power.

The invention further consists in a novel form of valve in which it is practically impossible for impurities in the oil or other lubricant to clog the passage ways, and in other details of construction which will be hereafter more fully described and claimed as the specification proceeds.

Figure 1 is a vertical central sectional detail view of the preferred form of mechanism illustrating this invention in concrete form. Fig. 2 is a sectional plan view taken approximately upon the line 2—2 of Fig. 1. Fig. 3 is a sectional plan view taken on the irregular horizontal line 3—3 of Fig. 1. Fig. 4 is a sectional plan view upon the line 4—4 of Fig. 1. Fig. 5 is a sectional detail view on the vertical line 5 of Fig. 1. Fig. 6 is a diagrammatic view showing the mounting of the pump with reference to the source of oil supply and devices for forcing oil from said supply to the pump.

As has heretofore been stated this invention is applicable to the pumping of any sort of lubricant but for convenience of description the lubricating material will frequently be referred to as oil.

A general receptacle or casing of any suitable material is provided, preferably of cylindrical form, having in its lower portion a relatively thick wall 10 within which is formed the oil space or reservoir 12 and the relatively thin upper portion 14 closed by cover 16 in any suitable manner. Integral with or otherwise secured within this receptacle are two spiders 18 and 20 carrying respectively bearings 22 and 24 within which a vertical shaft 26 is journaled. This shaft is prevented from sliding downward through the bearings by the use of a collar 28 which rests upon the upper end of bearing 22 and at the lower end of the shaft is a worm wheel 30 engaging said shaft in a tapered fit 32, and secured in position by the nut 34. This worm wheel bears against the lower side of bearing 24 so that when the parts are in place vertical movement of the shaft 26 is prevented. Extending through a stuffing box 36 in one side of the case is a shaft 38 carrying a worm 40 meshing with worm wheel 130 in the ordinary manner, whereby rotating the shaft 38 by any suitable source of external power will rotate shaft 26 within the oil receptacle.

Rigidly secured upon the upper end of the shaft 26 by any suitable means, such as pin 42, is a hub 44 carrying spider arms 46 on the outer end of each of which is journaled a roller 48 preferably made partially spherical, as shown. The plane of these spider arms 46 is, as shown, at an angle to the central axis of the shaft 26. Arranged around the center of shaft 26, outside the ends of spider arms 46 and within the thickened walls 10, heretofore described, are a plurality of vertical pump plungers 50, 51, 52—etc. to 60. The upper ends of these pump plungers carry screw threads 62 on which are threaded square sided ball shaped nuts 64. These nuts 64 are placed, as shown, between annular rings or plates 66 and 68 spaced apart by blocks 70 and secured together by screws 72 so as to form a sort of a cam track between said plates. The spacing members 70 are of such dimensions with reference to the size of the ball nuts 64 that sufficient space is provided between the plates 66 and 68 so that a ball and socket joint action may take place between these ball nuts 64 and annular members 66 and 68, without unscrewing the nuts.

The pistons 50—60 move only in one direction, viz., vertically and enter annular members 66 and 68 through holes 74 and 76 whereby these annular members 66 and 68 are held against rotation about the axis of shaft 26. As rollers 48 on spider arms 46 roll between the plates 66 and 68 it follows that, as shaft 26 is rotated, the spider arms 46 give to the annular plates 66 and 68 a wabbly motion corresponding in extent to the angularity of the spider arms 46 with reference to the shaft 26 with the result that the plungers 50—60 are successively reciprocated a distance equal to the angularity of the spider arms 46. The angular spider 46 and annular members 66 and 68 are the equivalent of a cam and will for convenience be so referred to hereafter.

At some suitable point in the oil receptacle 12 and adjacent to each of the plungers 50—60 is a recess 78 opening into said oil chamber. In the particular case here illustrated this recess is made an annular cut extending entirely around the interior wall 10 of oil chamber 12. The pistons 50—60 are made of such a length that when they are depressed to their extreme limit they pass below the lower surface 80 of recess 78, as shown in the case of piston 59 on the left hand side of Fig. 1 and that when they are raised to the extreme upper limit of their strokes they assume substantially the position of piston 53, as shown at the right hand side of Fig. 1, in which position the lower end of the piston is considerably above said surface 80, with the result that oil in oil chamber 12 and above the surface 80 can flow into and down the particular oil passage way 82, within which each particular piston moves, and ultimately out through one of the discharge pipes 84, which is provided for each oil passage way 82, the discharge ends, not shown, of each of said pipes 84 being connected in the ordinary manner to a bearing which is to be lubricated.

Slidably mounted within each oil passage way 82 is a valve member 86 normally pressed upward by a spring 88 against a stop 90. At the side of each valve 86 is a by-pass, or passage way 92 of such a size and length with reference to the valve 86 that when the upper face 94 is below the edge or lip 96 of passage way 92 oil within passage way 82 and below the particular piston, such as 59, can flow through by-pass 92 and ultimately out through the discharge pipe 84. This upper face 94 of valve 86 makes a very sharp intersection with the sides of passage way 82 so that a cutting edge is formed which will readily take care of any impurities carried by the oil which tend to engage the edge 96 of by-pass 92 and tend to prevent the proper closing of the valve.

In order to be very sure of satisfactory operation the valve just described is also supplemented by an ordinary ball valve 98 controlled by a spring 100 of ordinary construction. The spring 88 which moves the valve 86, as described, presses at its lower end upon the stuffing box member 102 screw threaded into an aperture 104 in casing 10 in the ordinary manner.

Inside of the oil receptacle 12 and above the spider 18 is a hollow float 106, preferably made of hollow copper or the like, adapted to float upon and be carried by any oil or other lubricant within chamber 12. Upon one side of the inner wall 10 of this chamber is a small bracket 108 having pivoted to it at 110 a bell crank composed of a long arm 112 and a short arm 114. The long arm 112 of the bell crank is forked, as best seen in Fig. 3, into supplemental arms 116 and 118 which pass around shaft 26 and engage the float 106 with the result that, as the float rises the short arm 114 of the bell crank is given a slight horizontal movement to the right in Fig. 1 against a horizontally mounted valve member 120 to force it against its seat 122 and thus close pipe or passage way 124 through which oil or other lubricant is forced into the lubricant chamber 12 by way of passageways 140 which are adjacent to the valve member, as shown in Fig. 5. Oil may be supplied to this pipe 124 from any suitable source of oil supply such for instance as tank 126 connected to pipe 124 by the pipes 128. The method of forcing the oil or lubricant 130 from this tank 126 is wholly immaterial and it may be accomplished by a small hand pump 132 or by compressed air passing through pipe 134 under control of valve 136 from any suitable pump or source of compressed air.

In the general operation of the device, the oil chamber 126 with oil 130 therein and means of forcing the oil out of the chamber is provided, the pump being so mounted that all of the pipes 84 which it is desired to use, are connected to bearings to be lubricated. The shaft 38 is connected to some part of the machine to be lubricated so that whenever it is running the shaft 38 will rotate, and when the operator starts the machine which is to be lubricated and shaft 38 begins to rotate and consequently the shaft 26 is rotated. The result is that the spider arms 46 move, as described, to gradually first raise and then lower each one of the various oil pistons 50—60. As the lower end of each piston rises above the face 80 oil within the chamber 12 runs into the opening 82 belonging to that particular piston and as that piston in its operation descends it engages the oil which is in passage way 82 and above valve 86 and as it further descends it forces valve 86 downward against the action of spring 88 until the oil is forced through the by-pass 92, through valve 98 and out through the tubular pipe 84 to the bearing to be lubricated. Whenever the quantity of oil in chamber 12 gets below a certain point the float 106 falls, thus allowing arm 112 of the bell crank to fall, thus allowing the pressure of the oil in chamber 126 to move valve 120 to the left in Fig. 1, and thus admit oil through openings around said valve into the chamber 12, the flow of the oil past valve 120 continuing until there is sufficient quantity of oil in said chamber 12 to lift the float 106 a sufficient height to engage arm 112 of the bell crank and thus force the valve 120 closed.

It will be noticed that by the foregoing construction a device may be provided having any reasonable number of oil pumps and that if the user should decide to use less than the number provided he can, by simply removing a particular pump piston and then calking or otherwise closing the passage way in which it moves use the remaining mechanism without that particular oil pump. In other words, the pump built as shown for eleven bearings may be used, as described, for any number between one and eleven.

It will be noted that the spider and cam mechanism, as illustrated and described, moves all of the piston plungers positively in both directions.

The claims are:—

1. In a lubricator, the combination of an oil reservoir provided with a plurality of exit passage ways arranged in an approximate circle, a rotatable member in the approximate center of said group of exit passage ways, a piston for each of said passage ways, a cam track member attached to each of said pistons by means of universal joints, a spider member rigidly attached to and in angular position with reference to said rotatable member, the end of said spider member entering said cam track, whereby, as the rotatable member is rotated the pistons are simultaneously operated as described.

2. In a lubricator, the combination of an oil reservoir, a rotatable shaft in the approximate center thereof, spider arms upon said shaft, all lying in the same plane at an angle to the axis of said shaft, rollers upon the ends of said spider arms, annular plates inclosing the rollers upon the ends of said spider arms to form a cam track in which said rollers travel, a plurality of piston members attached to said plate members by universal joints, and adapted to travel in and act as pumps within exit openings in said oil receptacle, whereby, as said shaft is rotated, said pistons are reciprocated to force oil out of said receptacle, for the purposes set forth.

In witness whereof, I have hereunto subscribed my name in the presence of two witnesses.

JAMES A. CHARTER.

Witnesses:
DWIGHT B. CHEEVER,
MARGARET D. ROBB.